United States Patent
Warrick et al.

(10) Patent No.: US 10,560,533 B2
(45) Date of Patent: *Feb. 11, 2020

(54) LEVERAGING MEDIA DEVICE PAIRING TO SIMPLIFY GRANTING MOBILE DEVICE ACCESS TO EXTERNAL NETWORK

(71) Applicant: Guest Tek Interactive Entertainment Ltd., Calgary (CA)

(72) Inventors: Peter S. Warrick, Calgary (CA); Brendan G. Cassidy, Calgary (CA); Lindsey M. Carriere, Calgary (CA); Lyndon J. Carriere, Calgary (CA); Aaron J. Segstro, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 55 days.

This patent is subject to a terminal disclaimer.

(21) Appl. No.: 16/004,100

(22) Filed: Jun. 8, 2018

(65) Prior Publication Data

US 2018/0295191 A1    Oct. 11, 2018

Related U.S. Application Data

(63) Continuation of application No. 15/706,437, filed on Sep. 15, 2017, now Pat. No. 10,015,265, which is a (Continued)

(51) Int. Cl.
*G06F 15/16* (2006.01)
*H04L 29/08* (2006.01)

(52) U.S. Cl.
CPC .......... *H04L 67/141* (2013.01); *H04L 67/142* (2013.01); *H04L 67/26* (2013.01);
(Continued)

(58) Field of Classification Search
CPC ... H04L 67/141; H04L 67/303; H04L 67/142; H04L 67/30; H04L 67/32; H04L 67/26
See application file for complete search history.

(56) References Cited

U.S. PATENT DOCUMENTS

| 7,620,978 B1 | 11/2009 | Reddy et al. |
| 8,732,753 B2 | 5/2014 | Warrick |

(Continued)

FOREIGN PATENT DOCUMENTS

| CA | 2775782 C | 7/2012 |
| CA | 2775804 C | 7/2012 |

(Continued)

OTHER PUBLICATIONS

Levere, Jane L., "In-Room Entertainment Turns Away From TV", New York Times, Apr. 30, 2013 (4 pages).

(Continued)

*Primary Examiner* — Padma Mundur
(74) *Attorney, Agent, or Firm* — ATMAC Patent Services Ltd.; Andrew T. MacMillan

(57) ABSTRACT

A media server receives a request from an unpaired mobile device, queries a login database to determine whether the mobile device is logged in for high speed Internet access, and, when yes, identifies a particular guest area of the hospitality establishment according to details in its login record. One of the media devices accessible from within the particular guest area is selected and paired with the mobile device without requiring a user of the mobile device to input into the mobile device a connect code of the selected media device. In another example, a user initiates a codeless pairing mode on a particular one of the media devices and begins interacting with the media server utilizing an unpaired mobile device. Since, only one media device can be in that mode at a time, the media server pairs the newly (Continued)

detected unpaired mobile device with the particular media device.

20 Claims, 8 Drawing Sheets

Related U.S. Application Data continuation of application No. 14/744,165, filed on Jun. 19, 2015, now Pat. No. 9,800,670.

(60) Provisional application No. 62/015,111, filed on Jun. 20, 2014.

(52) U.S. Cl.
CPC ............ *H04L 67/30* (2013.01); *H04L 67/303* (2013.01); *H04L 67/32* (2013.01)

(56) References Cited

U.S. PATENT DOCUMENTS

| | | |
|---|---|---|
| 8,813,138 B2 | 8/2014 | Warrick et al. |
| 8,813,211 B2 | 8/2014 | Baker et al. |
| 9,130,934 B2 | 9/2015 | Warrick et al. |
| 9,137,281 B2 | 9/2015 | Warrick et al. |
| 9,800,670 B2 | 10/2017 | Warrick et al. |
| 10,015,265 B2 | 7/2018 | Warrick et al. |
| 2003/0095521 A1* | 5/2003 | Haller ................ H04M 1/7253 370/338 |
| 2008/0057890 A1* | 3/2008 | McKillop ............. G06F 21/445 455/185.1 |
| 2010/0115113 A1 | 5/2010 | Short et al. |
| 2010/0201482 A1* | 8/2010 | Robertson .......... G07C 9/00111 340/5.61 |
| 2011/0126009 A1* | 5/2011 | Camp, Jr. ............. H04L 9/0825 713/168 |
| 2011/0263201 A1* | 10/2011 | Bukurak ................ H04W 4/00 455/41.2 |
| 2011/0314497 A1 | 12/2011 | Warrick et al. |
| 2011/0314502 A1 | 12/2011 | Levy et al. |
| 2013/0346564 A1 | 12/2013 | Warrick et al. |
| 2014/0143380 A1 | 5/2014 | Warrick et al. |
| 2014/0351392 A1 | 11/2014 | Baker et al. |
| 2015/0004915 A1* | 1/2015 | Zerr ...................... H04L 67/303 455/41.3 |
| 2015/0089222 A1* | 3/2015 | White ................. H04L 63/0428 713/168 |
| 2015/0134967 A1* | 5/2015 | Moore .................. H04L 9/3263 713/175 |
| 2015/0254726 A1 | 9/2015 | Cassidy et al. |

FOREIGN PATENT DOCUMENTS

| | | |
|---|---|---|
| CA | 2792482 C | 12/2012 |
| CA | 2820654 A1 | 12/2013 |

OTHER PUBLICATIONS

Office action dated Aug. 2, 2016 mailed by CIPO in counterpart Canadian patent application CA 2,895,240.

* cited by examiner

PMS table 300

| Room # | Information of currently registered guest ||| 
|---|---|---|---|
| | First name | Last name | Loyalty number |
| Room A | Peter | Warrick | 122-32-1001 |
| Room B | Lindsey | Carriere | 122-32-5007 |
| Room C | Brendan | Cassidy | 122-32-5587 |
| Room D | - | - | - |
| Room E | Josh | Wookey | 122-32-2345 |
| ⋮ | ⋮ | ⋮ | ⋮ |

302 304 306 308

HSIA login table 320

| User device (IP address) | Room # | Expiry |
|---|---|---|
| 192.168.1.101 | Room A | Expiry 1 |
| 192.168.1.103 | Room A | Expiry 2 |
| 192.168.1.107 | Room B | Expiry 3 |
| 192.168.1.111 | Room C | Expiry 4 |
| 192.168.1.139 | Room E | Expiry 5 |
| 192.168.1.145 | Room H | Expiry 6 |
| ⋮ | ⋮ | ⋮ |

322 324 326

Connect codes table 340

| Room | Connect code |
|---|---|
| Room-A | 55362F |
| Room-B | 63452U |
| Room-C | 89254O |
| Room-D | 89254O |
| Room-E | 57372P |
| Room-F | 23Y72E |
| ⋮ | ⋮ |

342 344

Stored data 240

FIG. 3

● Media control app

Pair device to your room     1900

Not connected

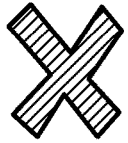

To connect to an in-room media device, please enter the connect code displayed by that device.

Based on your existing HSIA login, we have already filled in the connect code displayed by the TV (104a) in Room A, just press 'Submit' to accept.

1902

Enter connect code: `55362F_`

Submit ─1904

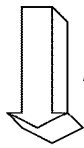 After user presses "Submit"

● Media control app

1920

Device successfully paired

Connected

Your device is now cleared to control and share media with the TV(104a) in Room A.

Time remaining: 14:45

1922

Disconnect

FIG. 5

LEVERAGING MEDIA DEVICE PAIRING TO SIMPLIFY GRANTING MOBILE DEVICE ACCESS TO EXTERNAL NETWORK

CROSS-REFERENCE TO RELATED APPLICATIONS

This application is a continuation of U.S. application Ser. No. 15/706,437 filed Sep. 15, 2017, which is a continuation of U.S. application Ser. No. 14/744,165 filed Jun. 19, 2015, which claims the benefit of priority of U.S. Provisional Application No. 62/015,111 filed Jun. 20, 2014. All of these applications are incorporated herein by reference.

BACKGROUND OF THE INVENTION

(1) Field of the Invention

The invention pertains generally to electronic services provided to guests of a hospitality establishment over a local area network. More specifically, the invention relates to techniques for pairing and logging in mobile devices to gain access to electronic services provided over a local area network of a hospitality establishment.

(2) Description of the Related Art

To keep up with guest expectations, hospitality establishments such as hotels and resorts are increasingly required to provide high tech electronic services over a local area network. Examples of two popular services include Internet access, also referred to as high speed Internet access (HSIA), and integration of in-room electronic media devices with guests' personal mobile devices. HSIA allows a checked in guest to access the Internet from their personal mobile device(s) such as laptop computers and mobile phones. Integration of in-room electronic media devices with guest devices enables guests to perform various functions such as remote control and media content sharing from their personal electronic gadgets with the media devices (e.g., set-top boxes, televisions (TVs), speakers, etc.) located in their registered guest room.

In many cases, hospitality establishments only want to offer these services to authorized guests and endeavor to ensure security and privacy of guest data over the network. For example, users are often required to "login" to these services before gaining access.

An example of a login process for HSIA involves new users attempting to access websites on the Internet instead being redirected or otherwise caused to view a web-based login portal. At the login portal, the user must authenticate themselves as an authorized guest by entering their room number and last name so that the portal can confirm the user-entered data matches that of the currently registered guest of the room. Such authentication is often referred to in the industry as "PMS authentication" because it involves checking to ensure that the user-entered room number and last name match the registered guest information in the hotel's property management system (PMS). Alternatively, another type of authentication for HSIA referred to as "room detection" may be utilized where the user's network traffic is traced back to an originating network access node such as the Ethernet port in a specific room of the hotel thereby confirming that the user is an actual guest of the hotel because only an authorized room guest could enter the room and plug in to that port. Room detection is particularly well-suited for wired connections; however, a similar method may also be used with wireless access where the user's network traffic is traced back to a micro-coverage access point (AP) that only services a specific guest or meeting room. The login process employed at a particular establishment may also involve the user agreeing to terms and conditions and/or may involve the user paying for basic or upgraded service entitlements (e.g., bandwidth, public IP address, etc.). Only after a new user has successfully completed the login process at the login portal is the user's mobile device permitted to access the Internet via the hotel's LAN.

An example of a login process for integration of in-room electronic media devices with guest devices involves a device pairing process where the user's mobile device is paired to a specific in-room media device via a "connect code" (also sometimes referred to as a passkey) displayed by the specific media device. For example, each in-room TV in a hotel may be assigned a unique and randomized connect code. When a user in a particular room wants to pair their mobile phone with their in-room TV, they turn on the TV and use the TV's menuing system to find and access a "device pairing" screen where the TV's unique connect code is displayed onscreen. The user then runs an app 140 or opens a particular web URL on their mobile device that has an input field for the user to enter a connect code so that the pairing process can be performed. By entering into their mobile phone the same connect code as is displayed by the on-room TV, the hospitality media system confirms that the user is an authorized guest because only an authorized guest would be able to enter the guest room in order to see the connect code displayed on the TV. The media system then pairs that mobile phone to that particular in-room TV and the guest can thereafter control the TV using the user interface on their phone or share media such as videos, pictures and music from their mobile phone to their in-room TV. Only after the user has completed this pairing process is the user's mobile device permitted to operate and share content with the in-room TV. Other in-room media devices can be paired with the user's device in a similar manner.

A problem with the above login approaches is that they are separate and unrelated to each other as they pertain to different, unrelated services. However, it is very likely that many guests of a hospitality establishment may wish to enjoy all entertainment services provided over the hotel's network. For example, again taking HSIA and in-room device integration (remote control and media sharing) as examples, a guest may wish to both surf the Internet from the guest's mobile phone and stream personal media files from the mobile phone to the in-room TV in the guest's assigned room. In this situation, the guest must perform two disjoint login processes: a first at a login portal to gain Internet access on their mobile phone, and a second to pair their mobile phone with a specific media device at the hotel so that they can control that media device and share media content from their mobile phone. To increase user convenience, it would be beneficial to facilitate cross logins between these different network services offered at a hospitality establishment.

BRIEF SUMMARY OF THE INVENTION

According to an exemplary embodiment of the invention, disclosed is a method of pairing mobile devices operated by guests of a hospitality establishment to media devices within the hospitality establishment. Each of the media devices supports presenting a respective connect code, and, during a pairing process, a user can input a particular connect code presented by a particular media device into a particular mobile device in order to cause the particular mobile device to become paired with the particular media device. The method includes receiving, over a computer network, a request from a mobile device that is not currently paired to any of the media devices, the request including an identifier of the mobile device. The method further includes querying a login database to determine whether the mobile device corresponding to the identifier has previously been logged in for high speed Internet access at the hospitality establishment, and, when yes, to identify a particular guest area of the hospitality establishment with which the mobile device is associated according to details stored in a login record for the mobile device. The method further includes selecting one of the media devices that is accessible from within the particular guest area as a selected media device, and pairing the selected media device with the mobile device thereby enabling one or more functions of the selected media device to be controlled according to commands received from the mobile device without requiring a user of the mobile device to input into the mobile device a connect code of the selected media device.

According to another exemplary embodiment of the invention, disclosed is an apparatus for pairing mobile devices operated by guests of a hospitality establishment to media devices within the hospitality establishment. Each of the media devices supports presenting a respective connect code, and, during a pairing process, a user can input a particular connect code presented by a particular media device into a particular mobile device in order to cause the particular mobile device to become paired with the particular media device. The apparatus includes a network interface coupled to a computer network available at the hospitality establishment, a storage device storing a login database including login records for one or more mobile devices that have been logged in for Internet access from the hospitality establishment, and one or more processors coupled to the network interface and the storage device. The processors are configured to receive via the network interface a request from a mobile device that is not currently paired to any of the media devices, the request including an identifier of the mobile device. The processors are further configured to query the login database to determine whether the mobile device corresponding to the identifier has previously been logged in for Internet access at the hospitality establishment, and, when yes, to identify a particular guest area of the hospitality establishment with which the mobile device is associated according to details stored in a login record for the mobile device. The processors are further configured to select one of the media devices that is accessible from within the particular guest area as a selected media device; and pair the selected media device with the mobile device thereby enabling one or more functions of the selected media device to be controlled according to commands received from the mobile device without requiring a user of the mobile device to input into the mobile device a connect code of the selected media device.

According to another exemplary embodiment of the invention, disclosed is a method of logging in mobile devices operated by guests of a hospitality establishment. The hospitality establishment includes a plurality of media devices supporting presenting a respective connect code, and, during a pairing process, a user can input a particular connect code presented by a particular media device into a particular mobile device in order to cause the particular mobile device to become paired with the particular media device. The method includes receiving, over a computer network, a request from a mobile device that is not currently authorized for Internet access, the request including an identifier of the mobile device, and querying a pairing database to determine whether the mobile device corresponding to the identifier is paired with a particular media device. The method further includes, when the mobile device is paired with a particular media device, reconfiguring an access controller between a local area network at the hospitality establishment and the Internet to allow the mobile device to access the Internet without requiring a user of the mobile device to perform a full Internet login process before gaining access to the Internet.

According to another exemplary embodiment of the invention, disclosed is an apparatus for logging in mobile devices operated by guests of a hospitality establishment. The hospitality establishment includes a plurality of media devices supporting presenting a respective connect code, and, during a pairing process, a user can input a particular connect code presented by a particular media device into a particular mobile device in order to cause the particular mobile device to become paired with the particular media device. The apparatus includes a network interface coupled to a computer network available at the hospitality establishment; a storage device storing a login database including login records for one or more mobile devices that have been logged in for Internet access from the hospitality establishment; and one or more processors coupled to the network interface and the storage device. The processors are configured to receive, over a computer network, a request from a mobile device that is not currently authorized for Internet access, the request including an identifier of the mobile device; query a pairing database to determine whether the mobile device corresponding to the identifier is paired with a particular media device; and when the mobile device is paired with a particular media device, reconfigure an access controller between a local area network at the hospitality establishment and the Internet to allow the mobile device to access the Internet without requiring a user of the mobile device to perform a full Internet login process before gaining access to the Internet.

According to another exemplary embodiment of the invention, disclosed is a method of logging in mobile devices operated by guests of a hospitality establishment. The hospitality establishment includes a plurality of media devices, and a pairing process allows mobile devices operated by guests of the hospitality establishment to become paired with one or more of the media devices. The method includes receiving, over a computer network, a request from a mobile device that is not currently authorized for Internet access, the request including an identifier of the mobile device. The method further includes querying a pairing database to determine whether the mobile device corresponding to the identifier is paired with at least one of the media devices. When the mobile device is paired with at least one of the media devices, the method further includes reconfiguring an access controller between a local area network at the hospitality establishment and an external computer network to allow the mobile device to access the external computer network without requiring a user of the mobile device to perform a full external computer network login process before gaining access to the external computer network.

According to another exemplary embodiment of the invention, disclosed is an apparatus for logging in mobile devices operated by guests of a hospitality establishment. The hospitality establishment includes a plurality of media devices, and a pairing process allows mobile devices operated by guests of the hospitality establishment to become paired with one or more of the media devices. The apparatus includes a network interface coupled to a computer network available at the hospitality establishment, a storage device storing a login database including login records for one or more mobile devices that have been logged in for external computer network access from the hospitality establishment, and one or more processors coupled to the network interface and the storage device. By the one or more processors executing a plurality of instructions loaded from a storage medium, the one or more processors are configured to receive, over the computer network, a request from a mobile device that is not currently authorized for external computer network access, the request including an identifier of the mobile device. The one or more processors are further configured to query a pairing database to determine whether the mobile device corresponding to the identifier is paired with at least one of the media devices. The one or more processors are further configured to, when the mobile device is paired with at least one of the media devices, reconfigure an access controller between a local area network at the hospitality establishment and an external computer network to allow the mobile device to access the external computer network without requiring a user of the mobile device to perform a full external computer network login process before gaining access to the external computer network.

In an advantageous embodiment, the system leverages information obtained when a user device gains access to a first service to thereby reduce the requirements for the user device to gain access to a second service.

These and other advantages of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof.

FIG. 3 shows portions of a PMS database, high speed Internet access login database, and connect code database as stored in the storage media of FIG. 2.

FIG. 5 shows user interface screens displayed by a touchscreen on the tablet computer of FIG. 1 when pairing to a selected one of the media devices.

DETAILED DESCRIPTION

Figure 1:
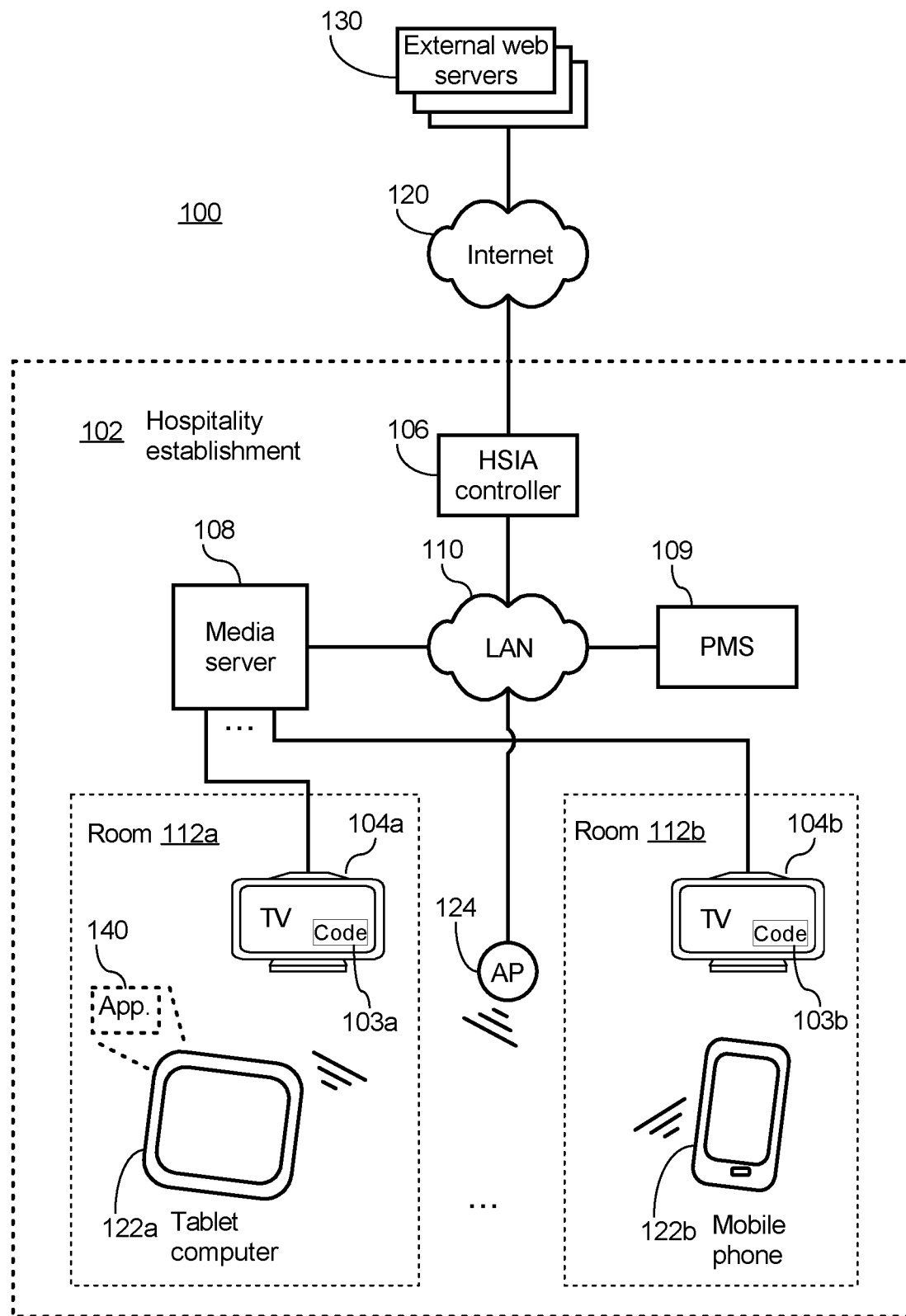
FIG. 1 illustrates a block diagram of a system for facilitating cross logins between different network services offered at a hospitality establishment according to an exemplary embodiment of the invention.

FIG. 1 illustrates a block diagram of a system 100 for facilitating cross logins between different network services offered at a hospitality establishment according to an exemplary embodiment of the invention. In this embodiment, the system 100 allows guests of the hospitality establishment 102 to utilize mobile devices 122 to access multiple services offered by the hospitality establishment. To facilitate description of an advantageous usage, the hospitality establishment 102 in this embodiment is a lodging establishment such as a hotel or resort and the system 100 enables guests to utilize their personal mobile devices 122 to access at least two services offered by the lodging establishment: a) remote control of in-room device(s) 104 in the user's assigned guest room 112 and b) Internet 120 access. It is to be understood that other embodiments with other types of hospitality establishments and services are also possible.

As shown in FIG. 1, the hotel 102 in this embodiment includes a high speed Internet access (HSIA) controller 106, a media server 108, and a property management system (PMS) 109 coupled to a local area network (LAN) 110. The media server 108 is coupled to a plurality of in-room media devices including televisions (TVs) 104 located in various guest rooms 112 of the hotel 102. Other media devices (not shown) may also be coupled to media server 108 in other embodiments such as set-top boxes (STBs), video projectors 114, gaming systems, speakers, etc., and these media devices may be located and accessible to guests in other areas of the hotel such as the lobby area, meeting rooms, conference rooms, outdoor areas, pool deck, restaurant tables, shopping areas, etc.

The HSIA controller 106 is coupled between the hotel's LAN 110 and the Internet 120 and controls access between these two networks 110, 120. In addition to the functionality described herein, in order to act as an access controller, the HSIA controller 106 also performs access control functionality well-known in the art such as a firewall and/or gateway functions.

The PMS 109 manages various information at the hotel 102 such as guest room-assignments and folios.

Coupled to the Internet 120 are a plurality of external web servers 130, which represent what is commonly referred to as the world wide web. Other types of external servers (not shown) in addition to web servers 130 are also coupled to the Internet 120.

One or more guests staying at the hotel 102 in this example have brought to the hotel 102 a plurality of mobile devices 122 including a tablet computer 122*a* utilized by a guest staying in room 112*a* and a mobile phone 122*b* utilized by a guest staying in room 112*b*.

One service that is made available by the hotel 102 is remote control of in-room entertainment devices 104 and other entertainment features such as free-to-guest (FTG) television channels, video-on-demand (VOD), and personal media streaming and sharing etc. If users so desire, they may download and install on their mobile devices 122 a software application 140 (hereinafter referred to as the hotel's "app" 140) that allows the users of these devices 122 to, among other functions, remotely operate the TV 104 in their assigned guest room 112 by interacting with the app 140 via the user interface (UI) on the mobile device 122. In this example, the user of the tablet computer 122a in room 112a ("Room A") has installed the hotel's app 140; however, the user of the mobile phone 122b in room 112b ("Room B") has not installed the hotel's app 140.

An example usage scenario with reference to the mobile phone 122b in FIG. 1 in an exemplary embodiment is as follows:

A guest arrives at the hotel 102 with mobile phone 122b and is checked in to guest room 112b. The guest utilizes the mobile phone 122b to access a first network service at the hospitality establishment, for example, to attempt to access web servers 130 on the Internet 120. As this is a new device 122, before gaining access to the Internet 120, the HSIA controller 106 requires the user to log in at a web-based login portal and during the login process determines the user's particular guest room, e.g., room 112b as shown in FIG. 1. After properly logging in and confirming the guest is the authorized guest of room 112b, the HSIA controller 106 allows mobile phone 122b to access external web servers 130 on the Internet 120.

Sometime later, the user decides to stream a movie stored on the mobile phone 122b to the in-room TV 104b in the guest's assigned hotel room 112b. The media server 108 detects that mobile phone 122b is requesting streaming services on the LAN 110, for example, mobile phone 122b may be attempting to stream content utilizing the AirPlay® protocol. Because the user has already completed the HSIA login process, which included determining the user's particular room 122b at the hotel 102, the media server 108 automatically selects the TV 104a in the guest's assigned room 112a as the output device for the streaming content and acts as a proxy forwarding the stream from the mobile phone 122b to the selected in-room TV 104b.

Beneficially, after the user has logged in for Internet access 120, media sharing functionality of the mobile phone 122b "just works" and the user does not need to even install or run the hotel's app 140 in order to pair their personal device 122b to the in-room TV 104b and successfully stream movies to their in-room TV 104. Instead, as long as the user has previously utilized the mobile phone 122b to log in for Internet 120 access (e.g., at the login portal provided by the HSIA controller 106 in this embodiment), the media server 108 is able to correlate the IP address of the mobile phone 122b to guest room 112b and then select the TV 104b in that room as the output device on which to show the user's streamed movie. User convenience for movie streaming is thereby increased because no app 140 is required to be run and the user does not need to perform a pairing process using connect code 103b displayed on the in-room TV 104b.

In the event that a user does choose to install the hotel's app 140, for example, the user of the tablet computer 122a shown in FIG. 1 has installed hotel app 140, upon running the app 140 after logging in for Internet 120 access, the app 140 by default suggests to the user that their tablet computer 122a be paired to the TV 104a in the user's own guest room 112a. In this way, the user does not need to manually enter the connect code 103a displayed by the TV 104a in their assigned room in order to pair these two devices 122a, 104a together. User convenience is thereby increased in situations where the user has first logged in for Internet access and then runs the app 140.

In yet another example, if the user of the tablet computer 122a first runs the app 140 and performs device pairing according to a displayed connect code 103 before logging in to access the Internet 120, a similar cross login for Internet access 120 based on the pairing result may be performed. In this case, the order of services is reversed and the user does enter into the app 140 running on the in-room tablet computer 104a the unique connect code 103a displayed by the in-room TV 104a in order to pair these two devices 122a, 104a. The media server 108 receives the connect code 103a from the tablet computer 122a and then stores a correlation between the IP address of the tablet computer 122a to guest room 112a because this is the only room where the connect code 103a was displayed.

Once this pairing process is done, the tablet computer 122a is thereafter automatically logged in for Internet 120 access by the HSIA controller 106 so that the user may avoid performing any login process at a login portal (or may only need to perform a simplified login process such as merely agreeing to terms and conditions) when attempting to use tablet computer 122a to browse to an external web server 130 after pairing their tablet computer 122a to the in-room TV 104a. Entitlements for HSIA such as bandwidth levels may be automatically set according to the default entitlement of the user's assigned room 112a or the identity of the guest registered for that room 112a. For example, VIP rooms may receive a higher bandwidth entitlement than standard rooms. Because the HSIA login process does not need to determine the room associated with the user device 112a (because this was already established via the device pairing process), user convenience is increased in situations where the user has first paired their device 122 to their room 112 using either a connect code or a codeless pairing mode such as described below in FIG. 7 and then attempts to access the Internet 120. A user who has already paired their personal device 122 to an in-room device 104 does not need to perform the full HSIA login process before gaining access to the Internet 120.

Figure 2:
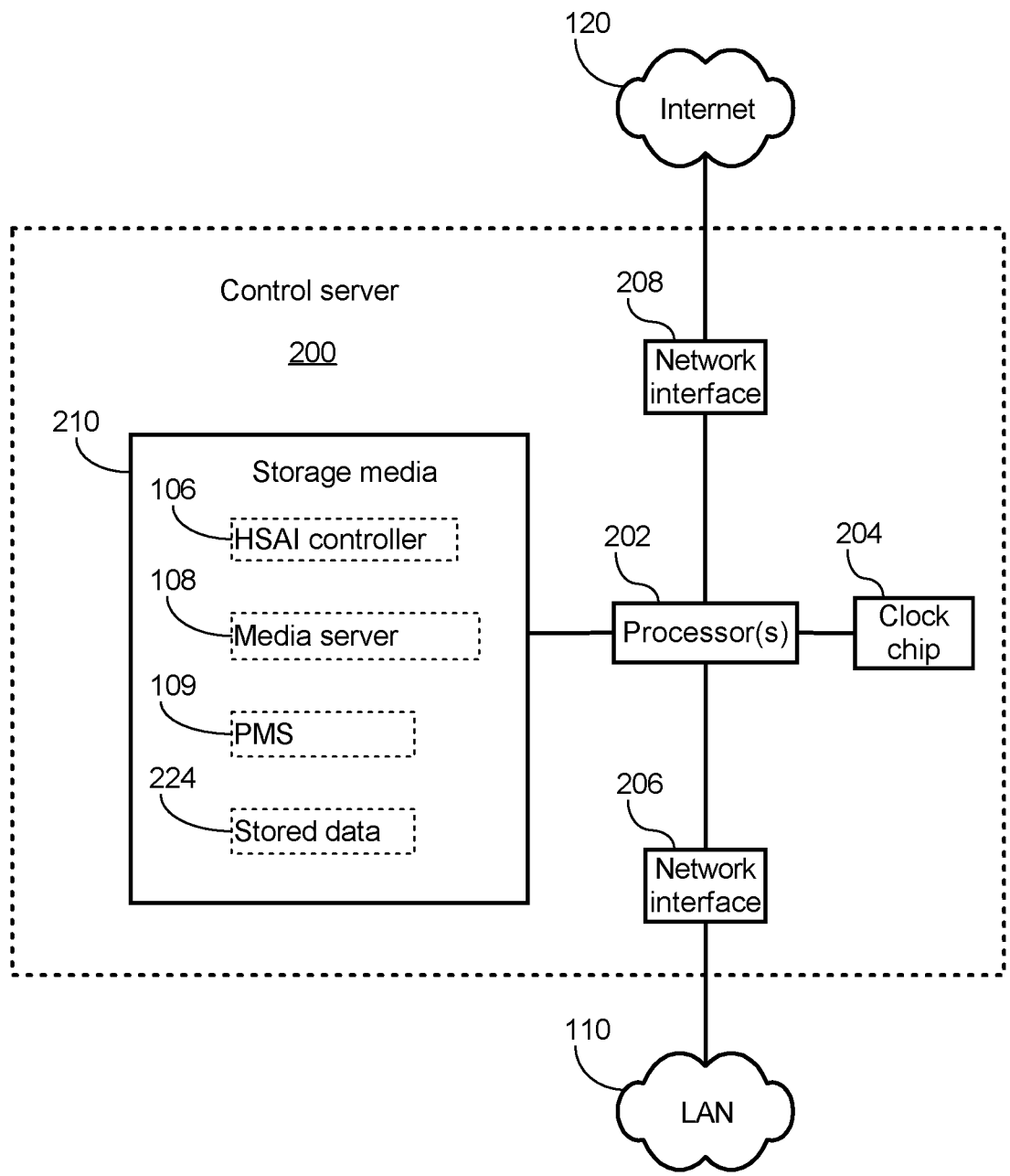
FIG. 2 shows a block diagram of a control server for implementing the media server, the high speed Internet access (HSIA) controller, and the property management system (PMS) of FIG. 1 according to an exemplary embodiment of the invention.

FIG. 2 shows a block diagram of a control server 200 for implementing the media server 108, the HSIA controller 106, and the PMS 109 of FIG. 1 according to an exemplary embodiment of the invention. In this embodiment, the control server 200 is a computer server including one or more processor(s) 202, a clock chip 204, a first network interface 206 coupled to the LAN 110, a second network interface 208 coupled to the Internet 120, and storage media 210 such as hard disk drives, random access memory (RAM), and/or flash storage device(s).

The storage media 210 stores various software modules including modules for performing functions of the HSIA controller 106, the media server 108, and the PMS 109 of FIG. 1. The storage module 210 may also store modules (not shown) for performing other complementary functionality such as a bandwidth manager and a gateway/firewall, for example. The storage media 210 also stores a variety of storage data 224 that is utilized by the various modules 106, 108, 109, 224 when performing their respective functions.

In the following description the plural form of the word "processors" is utilized as it is common for a CPU of a computer server to have multiple processors 202 (sometimes also referred to as cores); however, it is to be understood that a single processor 202 may also be configured to perform the described functionality in other implementations.

FIG. 3 shows portions of a PMS database, high speed Internet access login database, and connect code database as stored in the storage media 210 of FIG. 2. In this example, the illustrated portions are database tables 300, 320, 340 organized in rows and columns.

As shown in FIG. 3, a PMS table 300 includes a plurality of rows storing data about each room 112 at the hotel 102. In particular, a room number column 302 stores the room number identifier, a first name column 304 stores the guest's first name, a last name column 306 stores the guest's last name, and a loyalty program number column 308 stores a loyalty program membership identifier assigned to and utilized by the guest. Other columns (not shown) may also be stored to show other information about the current guest such as a check-in time and scheduled check-out time etc. The guest data for the various rooms is automatically updated by the PMS 109 as guests check in and out of the hotel 102. Currently vacant rooms are represented by a dash "-" in this example.

An HSIA login table 320 includes a plurality of rows storing login records for each of the various personal electronic devices 122 that are currently logged in and authorized for Internet 120 access from the hotel 102. In particular, an IP address column 322 stores the IP address assigned to the mobile device 122 on the LAN 120, a room number column 324 stores the room identifier with which the logged in mobile device 122 is associated, and an expiry column 326 stores the date and time that the mobile device's 122 login access is set to expiry. As new devices 122 are logged in and expire the rows of the login table 320 are automatically updated by the HSIA controller 106 accordingly. The clock chip 204 is used by the processors 202 to determine when expiry times in column 326 are met.

A connect codes table 340 includes a plurality of rows storing the current connect codes 103 for various rooms 112 at the hotel 102. In particular, a room column 342 stores an identifier of the hotel guest room 112 and a connect code column 344 stores the currently assigned connect code 103 that can be utilized by a guest in order to pair a particular mobile device 122 with that room 112. For example, assuming Room-A corresponds to guest room 112a of FIG. 1, the connect code 103a displayed by TV 104a in that room 112a for pairing purposes would be "55362F" at the time of this example. In some embodiments, the connect codes in column 344 are automatically changed in a random manner over time as guests check in and out of the hotel 102. In this way, a guest who was previously staying in a particular room (e.g., room 112a) will no longer be able to pair their mobile device (e.g., table computer 122a) with that room 112a after the guest has checked out of the room 112a. Although in this example, multiple media devices 104 in a particular room 112 share a single connect code 103, in other implementations, "room" column 342 may become "media device" column 342 and each media device 104 at the hotel may be identified by its IP or MAC address or another type of identifier in a media device column 342 and may have a separate (unique) connect code 103 in column 344; i.e., guest devices 122 may be paired with specific media devices 104 rather than which particular rooms 112.

The stored data 224 also stores other data (not shown) in this embodiment including an in-room media device table storing the IP addresses and other details of the different media devices 104 that are accessible from in each of the hotel rooms 112, and a user-device-to-room-paring table storing current pairings between user devices 122 and rooms 112. The in-room media device table is access by the media server 108 to select a particular one of the media devices 122 that is located with a particular guest room 112 after the particular guest room 122 is determined. The user-device-to-room-pairing table is used by the media server 108 and the HSIA controller 106 to record and identify with which room 112 a particular mobile device 122 is currently paired.

Figure 4:
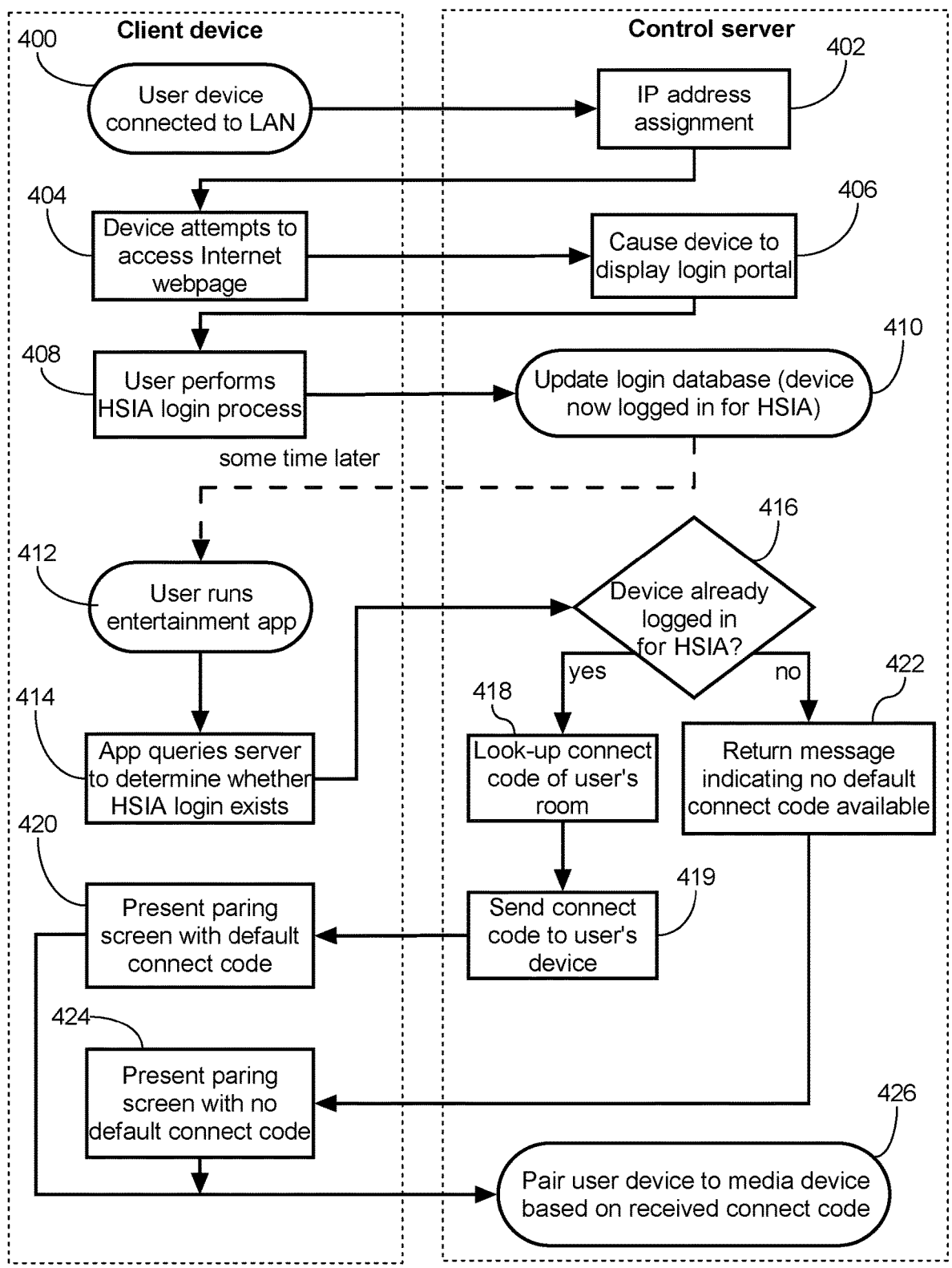
FIG. 4 illustrates a flowchart describing a method of pairing mobile devices operated by guests of a hospitality establishment to media devices within the hospitality establishment without requiring a user of the mobile device to input into the mobile device a connect code of the selected media device according to an exemplary embodiment of the invention.

FIG. 4 illustrates a flowchart describing a method of pairing mobile devices 122 operated by guests of a hospitality establishment 102 to media devices 104 within the hospitality establishment 102 without requiring the user to input connect codes 103 according to an exemplary embodiment of the invention. Beneficially, in this embodiment, as long as a user's HSIA login has not yet expired, the user is not required to input into their mobile device 122 a connect code 103 of a room 112 (or a specific media device 104) thereby simplifying the pairing process for the user.

The steps of the flowchart are not restricted to the exact order shown, and, in other configurations, shown steps may be omitted or other intermediate steps added. In this embodiment, the collection of client device steps on the left-hand side of the flowchart are performed by one or more processors (not shown) of the mobile device 122 executing instructions loaded from a storage medium within the mobile device 122. For example, the instructions may constitute an operating system, a web browser, and the hotel's app 140 loaded from internal flash or another storage device such as RAM or ROM memory or disk drive. Similarly, the collection of control server steps on the right-hand side of the flowchart are performed by the one or more processors 202 of the control server 200 executing software instructions to implement the HSIA controller 106, media server 108, and PMS 109 shown in storage media 210 of FIG. 2. Alternatively, the steps of FIG. 4 may be performed by other device(s) different than specified such as by one or more processors of standalone HSIA controller 106 and media server 108 located apart from each other and accessible via hotel LAN 110, the Internet 120, and/or another network such as a telecom data network. In this embodiment, the system 100 operates as follows:

At step 400, a guest arrives at the hotel 102, is checked in to guest room 112a (e.g., "Room A"), and connects their tablet computer 122a to the hotel's LAN 110 such as via a wireless access point 124 or another access node such as a wired Ethernet connection.

At step 402, a dynamic host configuration protocol (DHCP) server on the LAN 110 assigns the tablet computer 122a an Internet Protocol (IP) address to use on the LAN 110. Typically, the IP address assigned to the tablet computer 122a is a private IP address only valid on the hotel's LAN 110; however, in some circumstances the user's device 122a may instead be assigned a public IP address such as when the user pays an extra fee or is otherwise upgraded to a public IP address in order to run a server on LAN 110 that is accessible from the Internet 120.

At step 404, the user then attempts to surf the Internet 120 such as by directing a web browser running on the tablet computer 122a to the URL or IP address of an external 130 web site.

At step 406, the HSIA controller 106 detects that the user's tablet computer 122a has not yet logged in for Internet 120 access and causes the user to view a login portal instead of the user's desired external webserver 130.

At step 408, the user performs the HSIA login process at the login portal, which is an internal web sever provided by the HSIA controller 106 in this embodiment but could also be a separate web server located either on the LAN 110 or the Internet 120 in other embodiments. As a part of the login process, the user's registered room 112a at the hotel is determined. In some configurations this may be done by having the user enter their room number and other some other personal detail(s) of the user in input fields such as the user's name or loyalty program details on the login portal. The HSIA controller 106 then compares the personal details entered by the user with the currently registered user for the identified room as stored in the PMS 109. For example, if the user enters the room number for room 112a (e.g., "Room A") in FIG. 1 along with a last name of "Warrick", the HSIA controller 106 will check the PMS 109 to see whether the last name of the guest currently checked in to that room has a last name of "Warrick". For example, see first row of PMS table 300 showing the currently checked in guest of "Room A" has a last name of "Warrick". Only when the user performing the login process can correctly specify the room number and last name of registered guest of that room as already stored in the PMS table 300 can the user complete the login process.

At step 410, after the user has successfully completed the HSIA login process, the HSIA controller 106 creates and stores a login record specifying that the IP address of the user's tablet computer 122a is logged in and is associated with guest room 112a. For example, see the first row of the HSIA login table 320 associating "192.168.1.101" with "Room A". The HSIA controller 106 may also notify the media server 108 of the login records. Both push and/or pull techniques for notification may be utilized.

At step 412, sometime later (after successfully logging in for Internet access 120), the user installs the hotel's app 140 on the tablet computer 122a (if it is not already installed) and runs the app 140. The following description assumes the user's mobile device (e.g., table computer 122a) is not already paired with any media devices 104 at the hotel 102.

At step 414, the app 140 causes the processors of the tablet computer 122a to query the media server 108 on the hotel LAN 110 to check whether the tablet computer 122a has already logged in for HSIA access and can therefore be automatically paired to an in-room media device 104. For example, the app 140 may be programmed with a specific URL or IP address of the media server 108 as deployed at all properties, or may make a multicast dynamic name system (mDNS) request for the address of the media server 108 on the LAN 110 of a hotel 102.

At step 416, the media server 108 queries the HSIA controller 106 to check whether the IP address of the tablet computer 122a corresponds to a logged in user device. For example, assuming the IP address of the tablet computer 122a is "192.168.1.101", the HSIA controller 106 searches column 322 of the HSIA login table 320 to determine whether there is a row matching that IP address with an unexpired time in the expiry column 326. When yes, control proceeds to step 418; when no, control proceeds to step 422.

At step 418, because the mobile device 122 is already logged in for HSIA access, the media server 108 queries the HSIA controller 106 for the room number associated with the mobile device 122, and the HSIA controller 106 returns to the media server 108 the room number (e.g., "Room A") from the room number column 324 with which the HSIA login is associated.

At step 419, the media server looks up the current connect code 103a in column 344 for the user's room 112. In this example the room identifier is assumed to be "Room-A"; therefore, by searching connect code table 340, the media server 108 finds that the connect code 103a for this room 112 is "55362F". The connect code 103a for the user's room is transmitted back to the tablet computer 122a by the media server in response to the tablet computer's 122a query of step 414.

At step 420, the app 140 on the tablet computer 122a presents to the user a user interface (UI) screen to setup device pairing. By default the connect code 103a of the user's room 112 as received from the media server 108 at step 419 is already populated for the user (see default connect code 1902 shown in FIG. 5).

FIG. 5 shows user interface screens 1900, 1920 as displayed by a touchscreen on tablet computer 122a of FIG. 1 when pairing to a selected one of the media devices in the guest's room 112a at step 420 of FIG. 4.

As shown in the top screen 1900 of FIG. 5, the app 140 initially informs the user that the mobile device 122a is not currently paired with any media devices 104 at the hotel 102; however, based on the existing HSIA login for tablet computer 122a, the user's room is already known (e.g., "Room A") and the connect code "55362F" for that room 112a is already filled in for the user as a default connect code 1904. The value of the default connect code 1902 automatically filled in for the user is the same value as the connect code 103a that would be displayed on in-room TV 104a if the user navigated on the menu system of TV 104a to find the device pairing menu option. However, through the various steps of FIG. 4 as previously described, the user does not need to first manually turn on the in-room TV 104a or enter the device pairing menu option in order to see the connect code 103. Instead, the user can pair the tablet computer 122a to TV 104a by simply pressing the Submit button 1904 on the UI screen 1900 shown on the user's own personal electronic device 122a when the app 140 is run after the user has logged in for Internet access 120. The TV 104a may be off at the time the pairing is performed and then the user may turn it on using the tablet computer 122a as a remote control after the pairing process is complete. Beneficially, the user is not required to find or input into the tablet computer 122a any connect code 103a value of the TV 104a.

At step 426, the media server pairs the user's mobile device 122 (e.g., tablet computer 122a) with a media device 104 in the room 112 that corresponds to the connect code submitted by the user at the UI screen 1900. In this embodiment, the regular pairing process is performed by the media server 108 regardless of whether the user accepts the default connect code 1902 as automatically filled in by the app 140 at step 420 or if the user enters a different connect code than the default. In other words, at step 426, the media server 108 receives a connect code (either the default or another) as submitted by the user and then selects a media device 104 according to the received connect code. The media server 108 then stores another correlation in a user-device-to-room-pairing table of stored data 224 (not shown) associating the IP address of the user's mobile device 122 with the room identified by the received connect code. The stored data 224 may also include a "Paired device table" with a row for each pair of devices having a first column "Mobile device" and a second column "In-room media device". The identifiers of the two devices are added to these columns, for example, the IP address of the user's mobile device 122 and the URL (or IP address) of the in-room media device 104.

The lower UI screen 1920 shown in FIG. 5 shows what happens after the user accepts the default connect code 1902 and presses the Submit button 1904. As shown, the media server 108 has now paired the tablet computer 122a to TV 104a and the user can control the TV 104a using the tablet computer 122a as a remote control or share media files from tablet computer 122a to TV 104a using a network based media sharing protocol such as AirPlay® or All Share®.

In the example shown in FIG. 1, there is only one TV 104a in room 112a and therefore the media server 108 automatically selects this TV 104a as the selected media device to be paired with the tablet computer 122a. In other embodiments, there may be multiple TVs (or other media devices) in a single room 112 and the media server 108 may select one of these as the selected media device in any suitable manner. An in-room media device table (not shown) in stored data 224 may specify which media device(s) are in each room 112 and the media server 108 access this in-room media device to select a selected media device for pairing. For example, the media server 108 may select the in-room media device 104 in the user's room 112 that is currently turned on. In the event that multiple media devices 104 in the user's room 112 are currently turned on, the media server 108 may automatically select the media device from which most recent input from a user has been received. Alternatively, the user may be instructed via a message on the app 140 to take some action on the particular in-room media device that the user wishes to be paired with, for example to turn it on or off or enter a particular connect code etc. The media server 108 detects this change in state to determine the selected media device. In yet another example, the app 140 may display a menu or map showing the various in-room media devices and the user selects on the screen of their personal mobile device which in-room media device is to be the selected media device for pairing.

Further description of how a user's mobile device 122 can operate in-room media devices is available in U.S. Pat. No. 8,732,753 issued May 20, 2014 and entitled "METHOD OF OPERATING ONE OR MORE CONTROLLABLE DEVICES IN DEPENDENCE UPON COMMANDS RECEIVED FROM A PLURALITY OF MOBILE DEVICES AND SYSTEM CONTROLLER THEREOF", which is incorporated herein by reference.

Further description of how a user's mobile device 122 can share media with a particular in-room media device over a hotel's LAN 110 is available in U.S. Patent Application Publication No. 2011/0314497 published Dec. 22, 2011 and entitled "METHOD OF INTEGRATING CONTENT ON GUEST DEVICE WITH HOSPITALITY MEDIA SYSTEM, AND HOSPITALITY MEDIA SYSTEM THEREOF", and U.S. Patent Application Publication No. 2013/0346564 published Dec. 26, 2013 and entitled "DYNAMICALLY ENABLING GUEST DEVICE SUPPORTING NETWORK-BASED MEDIA SHARING PROTOCOL TO SHARE MEDIA CONTENT OVER COMPUTER NETWORK WITH SUBSET OF MEDIA DEVICES CONNECTED THERETO", which are both incorporated herein by reference.

It should also be noted that although an app 140 running on the mobile device 122 is used in the above example to allow the user to initiate and control the device pairing process, rather than an app 140, the user may also control and integrate content with in-room room media devices 104 via a web page generated by the media server 108 and displayed on the user's mobile device 122. For example, the above-shown UI screens 1900, 1902 of FIG. 5 may be provided to the tablet computer 122a by media server 108 using the HTTP protocol and displayed within a web browser running on the user's tablet computer 122a.

Returning again to the description of FIG. 4, the remaining steps 422, 424 illustrate what happens after step 416 if the user's mobile device 122 is not already logged in for HSIA at the time that the user runs the app 140 or otherwise attempts to integrate their mobile device with an in-room media device 104. At step 422, perhaps because the user's mobile device 122 has reached the expiry time in column 326 for Internet 120 access, the device 122 was not already logged in to HSIA at step 416 and the media server 108 simply transmits a message back to the app 140 on mobile device 122 indicating that there is no default connect code available (step 422). In this case, the app 140 displays a UI screen similar to the pairing setup screen 1900 shown in the upper portion of FIG. 5 except that the 2nd paragraph beginning "Based on your existing HSIA login . . . " and the default connect code 1902 are not shown. Instead, the connect code field is blank and the user must manually enter a connect code 103 such as by either typing in or taking a picture of a connect code 103a visually displayed on the in-room TV 104a in the user's room 112a. This is a normal connect-code based device pairing login process at the hotel that does not leverage any information from the HSIA login because the user's device 122 is not currently logged in to the HSIA. Alternatively, the user may perform pairing according to the codeless pairing mode described in FIG. 7.

In the above embodiment, the tablet computer 122a was not fully automatically paired with the selected TV 104a because the user still had to press a Submit button 1902 via the UI of their mobile device 122 in confirm the pairing should take place. This embodiment is useful to allow the user to easily confirm that the default pairing is to the correct room 112/TV 104 and to make sure the user actually wants to pair the two devices 122a, 104a. For example, the user may not wish to pair the tablet computer 122a to the TV 104a in their own room but may instead wish to pair it with another TV or other media device 104 in a conference or meeting room at the hotel 102. Providing a default connect code at field 1902 but not automatically performing the pairing process and allowing the user to erase that code and input any other connect code is beneficial to cover these situations.

In another embodiment, the pairing process may be fully automatic such that when the process arrives at step 420 in the above described flowchart, the user does not see pairing setup UI screen 1900 shown in the upper portion of FIG. 5 but instead sees only the device successfully paired UI screen 1920 in the lower portion of FIG. 5. For example, the flowchart of FIG. 4 may be modified upon first run for a particular mobile device 122 so that control proceeds from step 418 (look up connect code 103 of user's room 112) directly to step 426 in order to pair the user's device 122 to an automatically selected media device 104 in that room 112. This embodiment is beneficial to reduce the number of clicks the user needs to perform in order to pair their device with an automatically selected media device 104. In the event the media device (e.g., TV 104a) automatically selected by the media server 108 is not the one the user wanted to pair their device with, the user can simply click the Disconnect button 1922 to return to screen 1900 where they can either accept the default connect code for TV 104a (based on their HSIA login location) or change the connect code to pair with any other media device at the hotel according to the connect code 103 displayed by that media device. In this way, the user's mobile device 122 is automatically paired to their in-room media device 104 but the user can change the paring to another media device 104 if they so desire using a connect code 103, or can re-pair back to the automatically selected media device (their in-room media device 104) at any time without needing to manually input its connect code 103.

Furthermore, rather than triggering the automatic pairing process upon the user running the hotel's app 140 (or browsing to a device pairing web page hosted by the media server 108), the automatic pair process can be triggered as soon as the user has successfully logged in for HSIA access. For example, FIG. 4 can be modified so that control proceeds from step 410 "update login database—device now logged in for HSIA" directly to step 426 to select a media device 104 in user's room 112 and proceed to pair the user device 122 with this automatically selected media device 104. In this way, media sharing functionality such as using AirPlay® will immediately work as soon as the user has logged in for HSIA at the hotel 102. The user does not need to run any app 140 or manually setup or confirm any device pairing. Instead, the user's mobile device 122 running AirPlay® will automatically discover that the in-room TV 104a is available for sharing (or a media proxy running with media server 108 is available for sharing) and will display the AirPlay® icon in programs that support this functionality. For example, the user may choose to share their mobile device's 122 screen for display on their in-room TV 104a at any time after logging in to the HSIA server at the hotel 102. Other networking sharing protocols such as Digital Living Network Alliance (DLNA) and Allshare® may be enabled in the same way.

The automatic pairing process can also be triggered upon other events in addition to the user running app 140 or logging to the hotel's HSIA server as described above.

Figure 6:
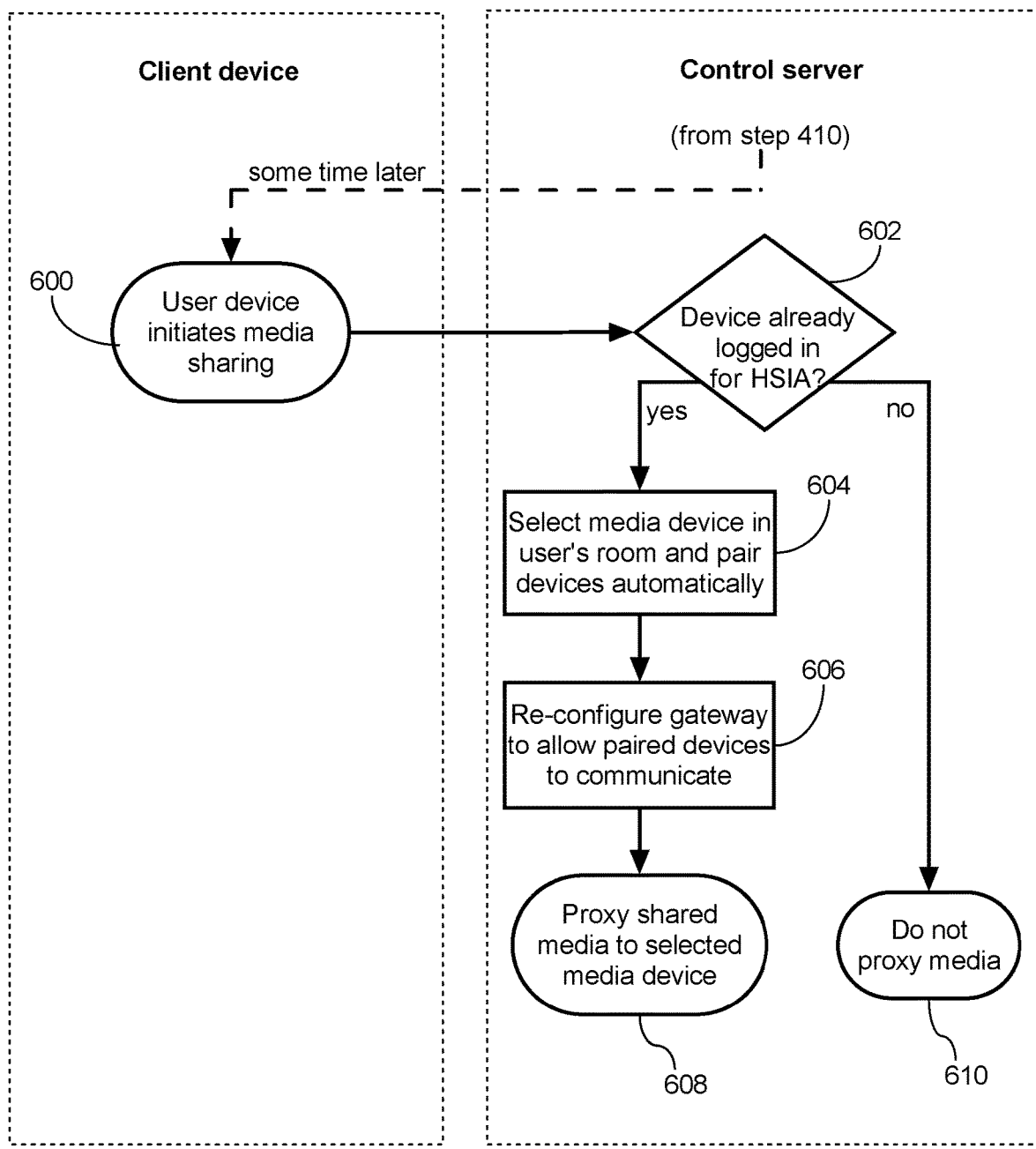
FIG. 6 illustrates a flowchart describing a fully automatic method of pairing mobile devices operated by guests of a hospitality establishment to media devices within the hospitality establishment according to an exemplary embodiment of the invention.

FIG. 6 illustrates a flowchart describing a method of pairing mobile devices 122 operated by guests of a hospitality establishment 102 to media devices 104 within the hospitality establishment 102 according to another exemplary embodiment of the invention. In this embodiment, the automatic pairing process is triggered in response to the user's device 122 attempting to share media or searching to see if there are any compatible media devices available on hotel LAN 110. This embodiment is beneficial to avoid wasting resources of the media server 108 automatically configuring and setting up pairing for user devices 122 that are not capable and/or are never utilized to share media with in-room media devices 104.

The steps of the flowchart are not restricted to the exact order shown, and, in other configurations, shown steps may be omitted or other intermediate steps added. As in FIG. 4, the collection of client device steps on the left-hand side of FIG. 6 are performed by one or more processors (not shown) of the mobile device 122 executing instructions loaded from a storage medium within the mobile device 122, and the collection of control server steps on the right-hand side of the flowchart are performed by the one or more processors 202 of the control server 200 executing instructions of the HSIA controller 106, media server 108, and PMS 109 in storage media 210 of FIG. 2. Alternatively, the steps of FIG. 6 may be performed by other device(s) different than specified below. In this embodiment, the system 100 operates as follows:

Step 600 occurs sometime after step 410 of FIG. 4 has been completed—in other words, after the user has successfully logged in for Internet access 120 at the hotel using a web browser running on their mobile device 122. In this example, the user is assumed to be registered in room 112b and their mobile device 122 is assumed to be the mobile phone 122b shown in FIG. 1.

At step 600, the user decides to stream media content such as a video file or music file from the mobile phone 122b to their in-room TV 104b. The mobile phone 122b sends a multicast DNS (mDNS) query searching for a compatible media device on LAN 110 according to a particular type of network-based media sharing protocol (e.g., AirPlay® or AllShare®).

At step 602, the media server 108 receives the mobile phone 122b sharing discovery attempt and checks to see whether the mobile phone 122b has already been logged in for HSIA and to determine the user's room similar to as described above for step 416 of FIG. 4. When yes, control proceeds to step 604; otherwise, control proceeds to step 610.

At step 604, the media server 108 automatically selects a media device 104 accessible from the user's room 112 as a selected media device 104 and automatically pairs it with the user's mobile device 122. Continuing the above example, the media server 108 at this step pairs the mobile phone 122b with in-room TV 104b.

At step 606, the media server 108 automatically reconfigures a gateway on LAN 110 so that the user mobile device 122 is able to directly communicate with the selected media device 104 with which it is now paired. For example, the IP address of the user's mobile phone 122b on a guest virtual local area network (VLAN) is cleared for direct communication with the IP address of the TV 104b on a media VLAN. Allowing direct IP communications between these paired devices is beneficial to enable a variety of protocols and functions while these devices 122b, 104b are paired.

At step 608, the media server 108 itself acts as a media output device using a particular media sharing protocol such as AirPlay® and then proxies any media shared by the user's mobile phone to the in-room media device 104 with which it is paired. For example, proxies media content shared by mobile phone 122b to the TV 104b in room 112b.

Further description of how steps 606 and 608 can be performed to enable media sharing between the user's device 122b and only in-room media devices 104b associated with the user's room are provided in U.S. Patent Application Publication No. 2013/0346564 published Dec. 26, 2013 and entitled "DYNAMICALLY ENABLING GUEST DEVICE SUPPORTING NETWORK-BASED MEDIA SHARING PROTOCOL TO SHARE MEDIA CONTENT OVER COMPUTER NETWORK WITH SUBSET OF MEDIA DEVICES CONNECTED THERETO", which has already been incorporated by reference in this description.

At step 610, because the user's mobile device 122 is not currently logged in for HSIA access, no automatic pair is performed. Any media that is shared by the user's mobile phone 122b at this step is merely routed to a null interface by the media server 108.

Figure 7:
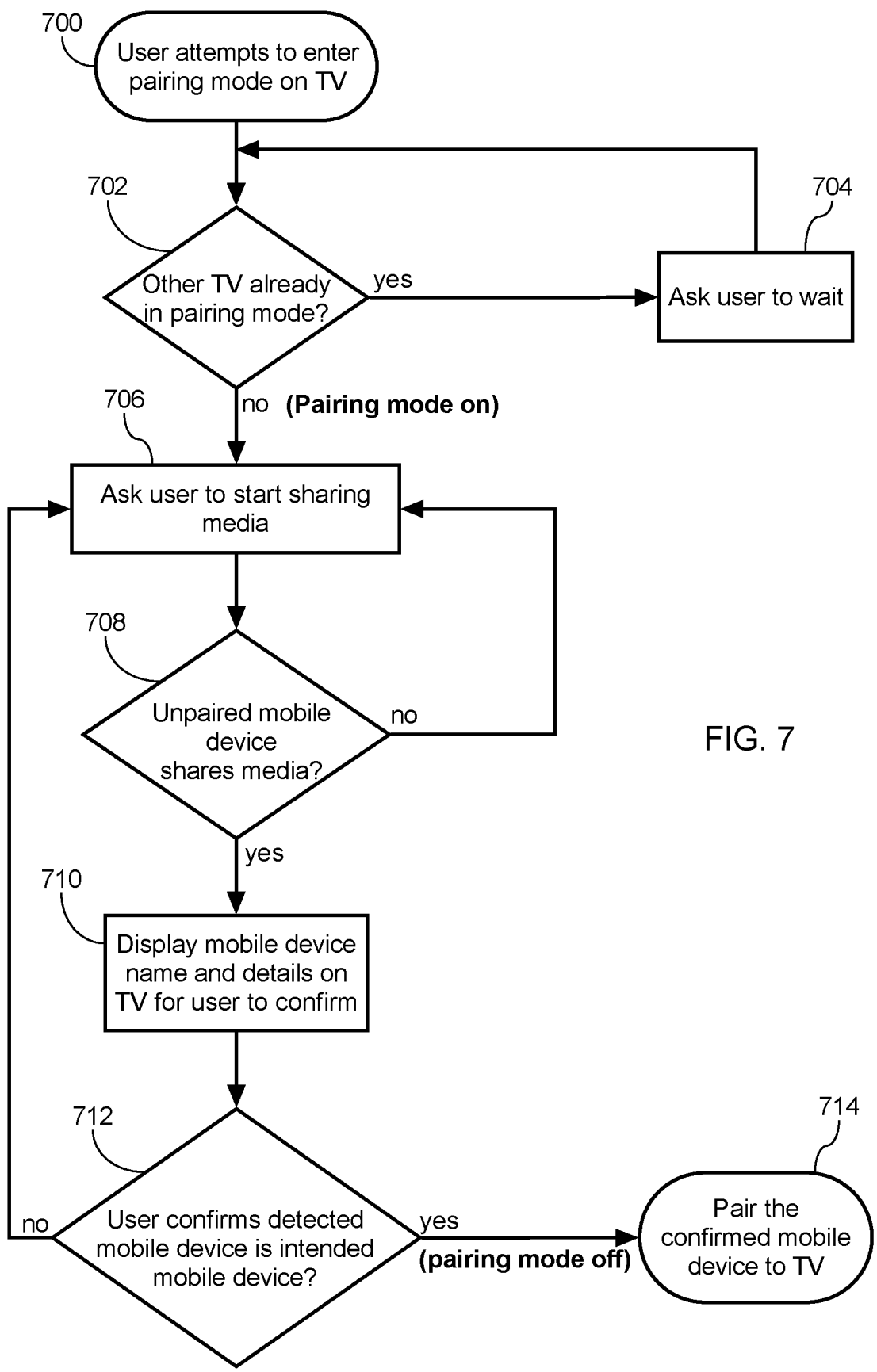
FIG. 7 illustrates a flowchart describing a method of pairing mobile devices operated by guests of a hospitality establishment to media devices within the hospitality establishment according to another exemplary embodiment of the invention.

FIG. 7 illustrates a flowchart describing a method of pairing mobile devices 122 operated by guests of a hospitality establishment 102 to media devices 104 within the hospitality establishment 102 according to another exemplary embodiment of the invention. In this embodiment, the pairing process occurs in response to the user entering a pair mode on their in-room TV 104. This embodiment is useful to allow users to pair mobile devices 122 that are not currently logged in for HSIA with in-room TVs 104 without requiring the user to enter any connect code 103. The steps of the flowchart are not restricted to the exact order shown, and, in other configurations, shown steps may be omitted or other intermediate steps added. In this embodiment the illustrated steps generally correspond to actions that are taken by the one or more processors 202 of the control server 200 executing instructions of the media server 108 of FIG. 2 in addition by processors of the in-room TV 104 and the user's mobile device 104. Alternatively, the steps of FIG. 7 may be performed by other device(s) different than specified below. In this embodiment, the system 100 operates as follows:

At step 700, a user attempts to enter a "codeless pairing mode" on an in-room media device 104. The phrase "codeless pairing mode" refers to the technique of pairing as described in FIG. 7 and is intended to differentiate this technique from other pairing techniques that may employed such as via a connect code 103 either populated by default or manually entered as shown FIGS. 4 and 5, and/or fully via fully automatic pairing such as illustrated in FIG. 6. A single hotel 102 or other hospitality establishment may enable multiple methods of pairing and all may be in use simultaneously. For example, users may first log in to HSIA on a mobile device 122 so that the mobile device is either fully automatically paired with their room's 112 TV 104 or so that the connect code of their room 122 (or TV 104) is prepopulated in the app 140, or users may employ the codeless pairing mode as described in the following for FIG. 7.

To access the codeless pairing mode, a user of guest room 112b with mobile phone 122b in FIG. 1 turns on the TV 104b in their assigned room 112b and accesses a device pairing menu option on TV 104b. As the user has not yet paired the TV 104b to their mobile phone 122b, the user needs to turn on and operate TV 104b manually at this step, for example, by using the TV's 104b infrared remote control or buttons on the front surface of the TV 104b. Software running on the TV 104 displays a menuing system visible to the guest and one of the menu selections is "Pair your mobile device to this TV." When the user selects this menu option, the TV 104 transmits a message to the media server 108 via LAN 110, the message indicating that TV 104 is attempting to enter the codeless pairing mode.

At step 702, the media server 108 accesses the stored data 224 to determine whether there are currently any other TVs 104 at the hotel 102 that are in the codeless pairing mode. In this embodiment, only one media device 104 can be in this mode at a time. To this end, the media server 108 stores in stored data 224 an indication of the particular media device 104 that is currently in codeless pairing mode. At this step, the media server 108 checks to see whether there is already a TV 104 in this mode; when yes, control proceeds to step 704 otherwise control proceeds to step 706.

At step 704, because there is already another TV 104 at hotel 102 in the codeless pairing mode, the media server 108 transmits a busy message back to the TV 104b in the guest's room. In response to receiving this busy message, the user's in-room TV 104b displays a message to the guest such as "Please wait to enter pairing mode." A countdown timer may also be displayed to indicate the maximum time that the user may need to wait before codeless pairing mode can be entered. The process returns to step 702 to wait until there are no other media devices 104 in codeless pairing mode.

At step 706, as there is no other TV 104 at the hotel 102 currently in codeless pairing mode, the media server 108 sends back a pairing-mode-on message to the TV 104b in the guest's room. The media server 108 also updates the stored data 224 to record an identifier of the TV 104b that is currently in codeless pairing mode. The TV 104b displays a message to the guest to inform the guest that "Pairing mode is now entered, please activate the 'screen mirror' function on your device." Following these directions, the user then activates their screen mirroring function to share their screen with media server 108 using the supported network-based media sharing protocol (e.g., AirPlay or All Share). Rather than screen mirroring, another type of media sharing may be used such as selecting a video file on the user's device 122 and sharing with the media server 108.

In this embodiment, the media server 108 acts as a media proxy on LAN 110 to which all user's mobile devices 122 can connect and share media content. The mobile devices 122 in this embodiment are prevented from directly sharing media content with the TVs 104 by isolating the TVs 104 on a separate VLAN from the user devices 122. In this way, the only device on LAN 110 that can receive shared media discoverable to the user's mobile phone 122b is the media server 108. At this step, when the user initiates screen mirroring on the mobile phone 122b, the mobile phone 122b attempts to establish a network sharing session with media server 108.

At step 708, the media server 108 waits for an unpaired mobile device 122 on LAN 110 to establish a new network sharing session. As previously mentioned at step 706, the user of mobile phone 122 was instructed to begin sharing their screen so the media server 108 waits at this step for a new user device 122 to establish a screen sharing session. When this occurs, control proceeds to step 710; in the event that no new user device 122 establishes a media session with media server 108, after a suitable timeout (two minutes) control returns back to step 706 in order to again ask the user to start streaming or exit the codeless pairing mode. The clock chip 204 may be utilized to track the timeout period in this step.

At step 710, the media server 108 transmits to the in-room TV 104b details of the new mobile device 122 that established the media sharing session at step 708. The details may include items such as the IP and/or MAC address of the user's mobile device 122 and preferable also includes a user-defined name or other identifiers as obtained by the media server 108 while establishing the media sharing session at step 708. For example, the AirPlay® protocol includes transmitting from the user device 122 a user-defined name such as "Brendan's phone" as part of the media sharing session. These details and identifiers are passed from media server 108 to the in-room TV 104a via LAN 110.

At step 712, the in-room TV 104b displays the various details of the mobile device 122 that newly established the media sharing session and confirms with the user that the user wishes to accept pairing their in-room TV with the identified mobile device 122. The purpose of the confirmation at this step 712 is to prevent an accidental pairing with a currently unpaired mobile device 122 that is not the user's but that just happened to establish a new media sharing session with the media server 108 at step 708. If the user does not recognize the device details, the user may refuse pairing with the detected mobile device 122 by clicking a "Refuse" button. If this happens the process returns to step 706 and is repeated until the user's mobile device 122 is properly detected as the unpaired mobile device sharing media at step 708. On the other hand, if the user does recognize the name of the detected mobile device 122, the user clicks an "Accept" button to continue.

At step 714, in response to the user clicking the accept button at step 710, the TV 104b transmits a message of the users acceptance of the detected mobile device 122b to the media server 108. The media server 108 then pairs the user's mobile phone 122b to the in-room TV 104b in the user's room 112b similar to as previously described for step 426 of FIG. 4. At this step, the media server 108 also updates the stored data 224 to delete the indication that in-room TV 104b is currently in codeless pairing mode as the process is now finished with respect to TV 104b. If there is another media device 104 waiting to enter codeless pairing mode (at step 702), the media server 108 may now proceed to step 706 for that other media device 104.

A benefit of the embodiment of FIG. 7 is that a user can pair their personal mobile device 122 to an in-room media device without needing to first perform the HSIA login process and without needing to type in or otherwise enter a connect code 103. User convenience during the pairing process is thereby increased.

Figure 8:
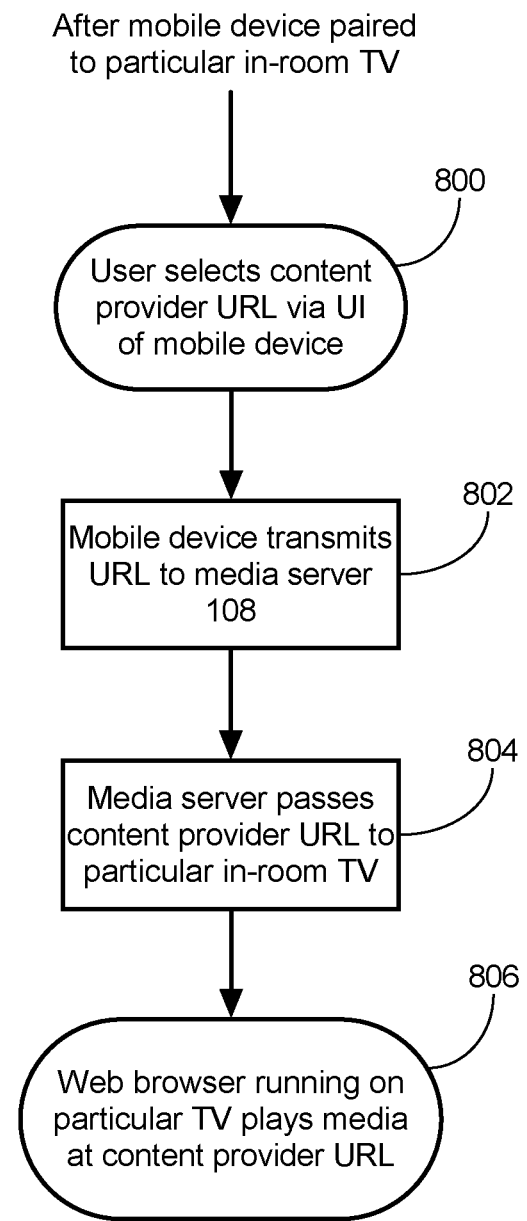
FIG. 8 illustrates a flowchart for a method of playing media on a paired media device according to an exemplary embodiment of the invention.

FIG. 8 illustrates a flowchart for a method of playing media on a paired media device 104 according to an exemplary embodiment of the invention. The steps of the flowchart are not restricted to the exact order shown, and, in other configurations, shown steps may be omitted or other intermediate steps added. In this embodiment the illustrated steps generally correspond to actions that are taken by the one or more processors 202 of the control server 200 executing instructions of the media server 108 of FIG. 2 in addition to processors of the in-room TV 104 and the user's mobile device 104. Alternatively, the steps of FIG. 8 may be performed by other device(s) different than specified below. In this embodiment, the system 100 operates as follows:

At step 800, a user interacts with the UI on their mobile device 122 in order to select a media asset provided by a third-party content provider. In one embodiment, the app 140 running on the user's mobile device (e.g., tablet computer 122a) has a content provider button labeled, for example, "YouTube®". After pressing the content provider button, the app 140 opens a search window that allows the user to find and select any desired video or other media asset provided by that content provider. In another embodiment, the user may open another app provided the content provider itself. For example, continuing the example where the content provider is YouTube®, the user may run the YouTube® app and find and select any video they so desire entirely within the YouTube® app. In this embodiment, each media asset on YouTube is identified by a unique URL address.

At step 802, the mobile device 122a transmits the URL (or other media asset identifier) of the media content selected by the user at step 800 to the media server 108. For instance, either or both of the hotel's app 140 and the content provider's app have one or more action options that may be taken on a media asset such as "Share with AirPlay" or "Send to my in-room TV" etc. In response to the user clicking one of these buttons, the mobile device 122 transmits the location or other identifier of the media asset on the content provider to the media server 108.

At step 804, the media server 108 in turn passes the URL (or other media assert identifier) to the in-room TV 104b (or other media device) that is currently paired with the user's mobile device 122b.

At step 806, the in-room TV 104b accesses the content provider either by running the content provider's app directly on the TV 104b or by running another hotel app or custom software on the TV in order to load and play the media assert identified by the URL (or other media asset identifier). For example, continuing the above YouTube® example, the URL of the video file selected by the user is accessed by the TV 104b at this step in an HTML5-compliant web browser. As YouTube supports playing video by HTML5, the TV 104a receives the media asset streamed by YouTube over the Internet 120 and plays it for the guest. The result is that the guest is able to use their personal electronic device 122 to select videos on YouTube for playback on the media device 104 at the hotel that is currently paired with the user's personal electronic device 122 (e.g., YouTube playback of videos on in-room TV 104b that are selected on mobile phone 122b).

In an exemplary embodiment, media devices 104 within a hospitality establishment 102 each supports presenting a respective connect code 103, and, during a pairing process, a user can input a particular connect code 103 presented by a particular media device 104 into the user's mobile device 122 in order to pair with the particular media device 104. To make this process easier, a media server 108 receives a request from a mobile device 122 not currently paired and queries a login database 320 to determine whether the mobile device 122 is logged in for high speed Internet 120 access at an HSIA controller 106, and, when yes, to identify a particular guest area 112 of the hospitality establishment 102 according to details in its login record. One of the media devices 104 accessible from within the particular guest area 112 is selected, and the selected media device 104 is paired with the mobile device 122 without requiring a user of the mobile device 122 to input into the mobile device 122 a connect code 103 of the selected media device 104. In another exemplary embodiment, a user initiates a codeless pairing mode on a particular one of the media devices and begins interacting with the media server utilizing an unpaired mobile device. Since, only one media device can be in that mode at a time, the media server pairs the newly detected unpaired mobile device with the particular media device.

Although the invention has been described in connection with preferred embodiments, it should be understood that various modifications, additions and alterations may be made to the invention by one skilled in the art without departing from the spirit and scope of the invention as defined in the appended claims. For example, not shown in the flowcharts of FIG. 4 and FIG. 6 are cutting off the user's Internet access when the expiry time in column 326 is reached or the user leaves the hotel 102, checks out etc.; however, these steps may be added. Likewise, the device pairing between a user's mobile device 122 and a media device 104 at the hotel 102 may be limited in time duration. For example, a similar expiry time as set for the HSIA login in column 326 may be utilized to cut off the device pairing. When the expiry time is reached as tracked by the clock chip 204, the media server 108 automatically un-pairs the user's mobile device 122 with the media device 104. In other example modifications, the HSIA controller 106 and/or the media server 108 may be centrally located somewhere external to the hospitality establishment 102 on the Internet 120 rather than at the hospitality establishment 102. In another example, rather than the connect code 103 being displayed on an in-room TV 104, a connect code may be displayed by the app 140 (or webpage) on the user's mobile device 122. The user may then enter the same connect code into a UI on the in-room TV 104 (or other media device) to establish a pairing between these two devices. The various devices described above or shown in the figures (e.g., each of user devices 122 and the HSIA controller media 106, server 108 and PMS 109) may be implemented as one or more computers having processor(s), network interface(s), storage medium/media, user interfaces, and other necessary hardware components.

Although the above examples have focused on a hotel app 140 that control in-room media devices, in other embodiments of the invention system 100 app 140 may allow users to access other types of services at other types of hospitality establishments 102. For example, the hotel app 140 may also allow aspects of the user's room 112 to be remotely operated such as temperature, window coverings, wake up calls, etc.

In another example at a coffee shop, restaurant, or other retail food service location, the app 140 may be installed by users in order to allow the users to order drinks and other food products without lining up at a counter to make the order.

In the above description, the exemplary user indication of "guest" is utilized to refer to users as it common for customers of a hospitality establishment to be referred to as guests. However, it is not a requirement that users must be customers of the hospitality establishment and the term "guest" in this description includes other users such as current guests in a hotel, people who are attending a conference or meeting in a hotel, staff members at the establishment, or any other person or user who may need or want to access a services at a hospitality establishment. Future guests that have reservations, potential future guests that don't yet have reservations, and other users may also make use of the invention. For example, a demonstration of the technology may be available in a hotel lobby and all users would be able to try out the system 100.

It should also be noted that although portable devices that are easily carried are anticipated by the inventors as being particularly useful, it is not a strict requirement that the mobile devices 122 be easily carried. Other larger devices such as desktop computers that are also capable of being moved may act as mobile devices 122 in conjunction with the invention.

Although the invention has been described as being utilized at a hotel for illustration purposes, the present invention is equally applicable to any hospitality related location or establishment wishing to provide different services to users over a LAN including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, the invention is applicable outside of the hospitality industry in addition to the above-described hospitality examples.

Furthermore, although the above examples have primarily focused on the user first logging in to HSIA and then automatically pairing the user's device 122 to a specific media device 104 according to a guest room 112 determined during the HSIA login, the order of the service usage is not limited to HSIA first. For example, in other embodiments, system 100 may leverage the room number determined as a result of the device pairing process first being performed by the user manually using a connect code 103 and thereafter simplify or entirely eliminate the HSIA login. In this way, when the user first pairs their mobile device 122 to an in-room media device 104 using a displayed connect code 103, the HSIA controller 106 is triggered to automatically log the user in to the Internet with a service entitlement (e.g. bandwidth, time expiry) set according to the user's room. Thereafter, when the user attempts to surf to a website using a web browser running on the mobile device 122 the user will find they already have Internet access. Alternatively, the user may need to merely accept terms and conditions but does not need to perform the full login process in order to verify that they are an authorized guest of the hotel because they have already paired their mobile device 122 to an in-room media device 104.

The following numbered clauses provide additional description of how the HSIA login process can leverage the media device pairing process:

37. A method of logging in mobile devices operated by guests of a hospitality establishment, wherein the hospitality establishment includes a plurality of media devices supporting presenting a respective connect code, and, during a pairing process, a user can input a particular connect code presented by a particular media device into a particular mobile device in order to cause the particular mobile device to become paired with the particular media device, the method comprising:

receiving, over a computer network, a request from a mobile device that is not currently authorized for Internet access, the request including an identifier of the mobile device;

querying a pairing database to determine whether the mobile device corresponding to the identifier is paired with a particular media device; and when the mobile device is paired with a particular media device, reconfiguring an access controller between a local area network at the hospitality establishment and the Internet to allow the mobile device to access the Internet without requiring a user of the mobile device to perform a full Internet login process before gaining access to the Internet.

38 The method of claim 37, further comprising when the mobile device is paired with the particular media device, reconfiguring the access controller to allow the mobile device to access the Internet without requiring the user of the mobile device to perform any additional login process before gaining access to the Internet.

39 The method of claim 37, further comprising when the mobile device is paired with the particular media device, reconfiguring the access controller to allow the mobile device to access the Internet while only requiring the user of the mobile device to agree to terms and conditions before gaining access to the Internet.

40. The method of any one of claims 37 to 39, further comprising requiring the full Internet login process involving at least one additional step to be performed by a second mobile device not currently paired to one of the media devices before reconfiguring the access controller to allow the second mobile device to gain Internet access.

41. The method of any one of claims 37 to 40, wherein the access controller comprises a gateway or a firewall.

42.The method of any one of claims 37 to 41, further comprising, when the mobile device is paired with the particular media device, reconfiguring the access controller to allow the mobile device to access the Internet with a service entitlement set according the particular media device with which the mobile device is currently paired.

43. The method of claim 42, wherein the access controller comprises a bandwidth manager, and the service entitlement comprises a bandwidth limit to be applied to the mobile device.

44. The method of any one of claims 37 to 43, further comprising, when the mobile device is paired with the particular media device, reconfiguring the access controller to allow the mobile device to access the Internet with a service entitlement set according a particular guest area within the hospitality establishment at which the particular media device currently paired with the mobile device is located.

45. The method of claim 44, wherein the particular guest area is a guest room of the hospitality establishment.

46. The method of any one of claims 37 to 45, further comprising changing the connect codes over time.

47. The method of any one of claims 37 to 46, wherein the identifier of the mobile device is the Internet Protocol (IP) addressed used by the mobile device on the computer network.

48. An apparatus for logging in mobile devices operated by guests of a hospitality establishment, wherein the hospitality establishment includes a plurality of media devices supporting presenting a respective connect code, and, during a pairing process, a user can input a particular connect code presented by a particular media device into a particular mobile device in order to cause the particular mobile device to become paired with the particular media device, the apparatus comprising:

a network interface coupled to a computer network available at the hospitality establishment;

a storage device storing a login database including login records for one or more mobile devices that have been logged in for Internet access from the hospitality establishment; and one or more processors coupled to the network interface and the storage device, and
configured to:
receive, over a computer network, a request from a mobile device that is not currently authorized for Internet access, the request including an identifier of the mobile device;
query a pairing database to determine whether the mobile device corresponding to the identifier is paired with a particular media device; and
when the mobile device is paired with a particular media device, reconfigure an access controller between a local area network at the hospitality establishment and the Internet to allow the mobile device to access the Internet without requiring a user of the mobile device to perform a full Internet login process before gaining access to the Internet.

49 The apparatus of claim 48, wherein the one or more processors are further configured to, when the mobile device is paired with the particular media device, reconfigure the access controller to allow the mobile device to access the Internet without requiring the user of the mobile device to perform any additional login process before gaining access to the Internet.

50 The apparatus of claim 48, wherein the one or more processors are further configured to, when the mobile device is paired with the particular media device, reconfigure the access controller to allow the mobile device to access the Internet while only requiring the user of the mobile device to agree to terms and conditions before gaining access to the Internet.

51. The apparatus of any one of claims 48 to 50, wherein the one or more processors are further configured to require the full Internet login process involving at least one additional step to be performed by a second mobile device not currently paired to one of the media devices before reconfiguring the access controller to allow the second mobile device to gain Internet access.

52. The apparatus of any one of claims 48 to 51, wherein the access controller comprises a gateway or a firewall.

53. The apparatus of any one of claims 48 to 52, wherein the one or more processors are further configured to, when the mobile device is paired with the particular media device, reconfigure the access controller to allow the mobile device to access the Internet with a service entitlement set according the particular media device with which the mobile device is currently paired.

54.The apparatus of claim 53, wherein the access controller comprises a bandwidth manager, and the service entitlement comprises a bandwidth limit to be applied to the mobile device.

55.The apparatus of any one of claims 48 to 54, wherein the one or more processors are further configured to, when the mobile device is paired with the particular media device, reconfigure the access controller to allow the mobile device to access the Internet with a service entitlement set according a particular guest area within the hospitality establishment at which the particular media device currently paired with the mobile device is located.

56.The apparatus of claim 55, wherein the particular guest area is a guest room of the hospitality establishment.

57.The apparatus of any one of claims 48 to 56, wherein the one or more processors are further configured to change the connect codes over time.

58. The apparatus of any one of claims 37 to 46, wherein the identifier of the mobile device is the Internet Protocol (IP) addressed used by the mobile device on the computer network.

The various separate configurations, elements, features, embodiment, and modules of the invention described above may be integrated or combined. One or more processors may operate pursuant to instructions stored on a tangible, non-transitory computer-readable medium to perform the above-described functions. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet 120. The one or more processors may be included in a general-purpose or specific-purpose computer that becomes a special purpose machine performing the above-described functions as a result of executing the instructions. In another example, rather than being software modules executed by one or more processors, the described functionality may be implemented as hardware modules configured to perform the above-described functions. Examples of hardware modules include all forms of programmable logic chips (PLDs), application specific integrated circuits (ASICs), field programmable gate arrays (FPGAs), as well as discrete circuit components. Functions of single modules and devices as described may be separated into multiple units, or the functions of multiple modules and devices may be combined into a single unit. Unless otherwise specified, features described may be implemented in hardware or software (including firmware) according to different design requirements. In addition to a dedicated physical computing device, the word "server" may also mean a service daemon on a single computer, virtual computer, or shared physical computer or computers, for example. Additionally, all combinations and permutations of the above described features and configurations may be utilized in conjunction with the invention.

What is claimed is:

1. A method of logging in mobile devices operated by guests of a hospitality establishment, wherein the hospitality establishment includes a plurality of media devices, and a pairing process allows mobile devices operated by guests of the hospitality establishment to become paired with one or more of the media devices, the method comprising:

receiving, over a computer network, a request from a mobile device that is not currently authorized for Internet access, the request including an identifier of the mobile device;

querying a pairing database to determine whether the mobile device corresponding to the identifier is paired with at least one of the media devices; and when the mobile device is paired with at least one of the media devices, reconfiguring an access controller between a local area network at the hospitality establishment and an external computer network to allow the mobile device to access the external computer network without requiring a user of the mobile device to perform a full external computer network login process before gaining access to the external computer network.

2. The method of claim 1, further comprising when the mobile device is paired with at least one of the media devices, reconfiguring the access controller to allow the mobile device to access the external computer network without requiring the user of the mobile device to perform any additional login process before gaining access to the external computer network.

3. The method of claim 1, further comprising when the mobile device is paired with at least one of the media devices, reconfiguring the access controller to allow the mobile device to access the external computer network while only requiring the user of the mobile device to agree to terms and conditions before gaining access to the external computer network.

4. The method of claim 1, further comprising requiring the full external computer network login process involving at least one additional step to be performed by a second mobile device not currently paired to one of the media devices before reconfiguring the access controller to allow the second mobile device to gain external computer network access.

5. The method of claim 1, wherein the access controller comprises a gateway or a firewall.

6. The method of claim 1, further comprising, when the mobile device is paired with at least one of the media devices, reconfiguring the access controller to allow the mobile device to access the external computer network with a service entitlement set according a particular media device with which the mobile device is currently paired.

7. The method of claim 6, wherein the access controller comprises a bandwidth manager, and the service entitlement comprises a bandwidth limit to be applied to the mobile device.

8. The method of claim 1, further comprising, when the mobile device is paired with at least one of the media devices, reconfiguring the access controller to allow the mobile device to access the external computer network with a service entitlement set according a particular guest area within the hospitality establishment at which the particular media device currently paired with the mobile device is located.

9. The method of claim 8, wherein the particular guest area is a guest room of the hospitality establishment.

10. The method of claim 1, wherein:
the identifier of the mobile device is an Internet Protocol (IP) addressed used by the mobile device on the computer network; and
the external computer network is the Internet.

11. An apparatus for logging in mobile devices operated by guests of a hospitality establishment, wherein the hospitality establishment includes a plurality of media devices, and a pairing process allows mobile devices operated by guests of the hospitality establishment to become paired with one or more of the media devices, the apparatus comprising:
a network interface coupled to a computer network available at the hospitality establishment;
a storage device storing a login database including login records for one or more mobile devices that have been logged in for external computer network access from the hospitality establishment; and
one or more processors coupled to the network interface and the storage device;
wherein, by the one or more processors executing a plurality of instructions loaded from a storage medium, the one or more processors are configured to:
receive, over the computer network, a request from a mobile device that is not currently authorized for external computer network access, the request including an identifier of the mobile device;
query a pairing database to determine whether the mobile device corresponding to the identifier is paired with at least one of the media devices; and
when the mobile device is paired with at least one of the media devices, reconfigure an access controller between a local area network at the hospitality establishment and an external computer network to allow the mobile device to access the external computer network without requiring a user of the mobile device to perform a full external computer network login process before gaining access to the external computer network.

12. The apparatus of claim 11, wherein the one or more processors are further configured to, when the mobile device is paired with at least one of the media devices, reconfigure the access controller to allow the mobile device to access the external computer network without requiring the user of the mobile device to perform any additional login process before gaining access to the external computer network.

13. The apparatus of claim 11, wherein the one or more processors are further configured to, when the mobile device is paired with at least one of the media devices, reconfigure the access controller to allow the mobile device to access the external computer network while only requiring the user of the mobile device to agree to terms and conditions before gaining access to the external computer network.

14. The apparatus of claim 11, wherein the one or more processors are further configured to require the full external computer network login process involving at least one additional step to be performed by a second mobile device not currently paired to any of the media devices before reconfiguring the access controller to allow the second mobile device to gain external computer network access.

15. The apparatus of claim 11, wherein the access controller comprises a gateway or a firewall.

16. The apparatus of claim 11, wherein the one or more processors are further configured to, when the mobile device is paired with at least one of the media devices, reconfigure the access controller to allow the mobile device to access the external computer network with a service entitlement set according a particular media device with which the mobile device is currently paired.

17. The apparatus of claim 16, wherein the access controller comprises a bandwidth manager, and the service entitlement comprises a bandwidth limit to be applied to the mobile device.

18. The apparatus of claim 11, wherein the one or more processors are further configured to, when the mobile device is paired with at least one of the media devices, reconfiguring the access controller to allow the mobile device to access the external computer network with a service entitlement set according a particular guest area within the hospitality establishment at which the particular media device currently paired with the mobile device is located.

19. The apparatus of claim 18, wherein the particular guest area is a guest room of the hospitality establishment.

20. The apparatus of claim 11, wherein:

the identifier of the mobile device is an Internet Protocol (IP) addressed used by the mobile device on the computer network; and the external computer network is the Internet.

* * * * *